United States Patent
Kishi et al.

(10) Patent No.: US 12,000,755 B2
(45) Date of Patent: Jun. 4, 2024

(54) WATERTIGHT TESTING DEVICE FOR A PIPE JOINT PART

(71) Applicant: KUBOTA CORPORATION, Osaka (JP)

(72) Inventors: Shozo Kishi, Amagasaki (JP); Yuito Komaru, Amagasaki (JP); Koji Kamachi, Amagasaki (JP); Masataka Shimomura, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 375 days.

(21) Appl. No.: 17/441,719

(22) PCT Filed: Mar. 24, 2020

(86) PCT No.: PCT/JP2020/012958
§ 371 (c)(1),
(2) Date: Sep. 22, 2021

(87) PCT Pub. No.: WO2020/196496
PCT Pub. Date: Oct. 1, 2020

(65) Prior Publication Data
US 2022/0196509 A1    Jun. 23, 2022

(30) Foreign Application Priority Data
Mar. 25, 2019  (JP) .............................. 2019-055792

(51) Int. Cl.
*G01M 3/04*   (2006.01)
*F16J 15/10*  (2006.01)

(52) U.S. Cl.
CPC .............. *G01M 3/04* (2013.01); *F16J 15/10* (2013.01)

(58) Field of Classification Search
CPC ... F16L 55/105; F16L 2101/30; F16L 58/185; F16L 55/1645; F16L 55/16455;
(Continued)

(56) References Cited

U.S. PATENT DOCUMENTS 2,481,013 A * 9/1949 Henderson .......... G01M 3/2853
73/49.1
3,194,310 A   7/1965 Loomis
(Continued)

FOREIGN PATENT DOCUMENTS

JP    06-221952 A    8/1994
JP    08-062088 A    3/1996
(Continued)

OTHER PUBLICATIONS

Extended European Search Report issued in European Patent Application No. 20779967.7 dated Apr. 22, 2002.
(Continued)

*Primary Examiner* — Tran M. Tran
(74) *Attorney, Agent, or Firm* — Kusner & Jaffe

(57) ABSTRACT

A watertight testing device includes a cylindrical core fit into a pipe joint part, a first seal member for sealing between the outer surface of the core and the inner surface of one pipe, a second seal member for sealing between the outer surface of the core and the inner surface of the other pipe, a first pressing member for pressing and compressing the first seal member into a first seal-member insertion space, a second pressing member for pressing and compressing the second seal member into a second seal-member insertion space, a moving device for moving the first and second pressing members in a pipe axial direction, and a test fluid feeder for feeding a test fluid into a test space.

6 Claims, 13 Drawing Sheets

(58) Field of Classification Search
CPC .. G01M 3/2815; G01M 3/022; G01M 3/2884; G01M 3/28–2892; G01M 3/30; G01M 3/085; G01M 3/2846; G01M 3/3227; G01M 3/2869; G01M 3/2861; G01M 3/2853

See application file for complete search history.

(56) References Cited

U.S. PATENT DOCUMENTS

| | | | | |
|---|---|---|---|---|
| 3,760,632 A * | 9/1973 | Illyes | G01M 3/2846 | 138/90 |
| 3,762,446 A * | 10/1973 | Tungseth | G01M 3/005 | 73/40.5 R |
| 3,779,068 A * | 12/1973 | Forsythe | G01M 3/005 | 73/49.1 |
| 4,070,904 A * | 1/1978 | VanderLans | G01M 3/2853 | 73/40.5 R |
| 4,132,111 A * | 1/1979 | Hasha | G01M 3/2861 | 277/320 |
| 4,136,552 A * | 1/1979 | Hasha | G01M 3/2861 | 73/46 |
| 4,194,389 A * | 3/1980 | Laging | G01M 3/2861 | 73/49.1 |
| 4,570,485 A * | 2/1986 | Lee, Jr. | G01M 3/2846 | 73/49.1 |
| 4,577,488 A * | 3/1986 | Broadus | G01M 3/04 | 228/103 |
| 4,582,551 A * | 4/1986 | Parkes | F16L 55/18 | 264/36.16 |
| 4,646,787 A * | 3/1987 | Rush | G01M 3/005 | 73/866.5 |
| 4,852,393 A * | 8/1989 | Pate | G01M 3/2853 | 73/49.5 |
| 4,890,483 A * | 1/1990 | Vetter | G01M 3/2853 | 73/49.1 |
| 5,066,208 A * | 11/1991 | Warmerdam | G01M 3/2853 | 264/269 |
| 5,209,105 A * | 5/1993 | Hasha | G01M 3/223 | 73/49.1 |
| 5,287,893 A * | 2/1994 | Elgar | F16L 55/18 | 138/109 |
| 5,295,760 A * | 3/1994 | Rowe | B67D 7/3209 | 405/129.55 |
| 5,495,750 A * | 3/1996 | Dufresne | G01M 3/2853 | 73/49.1 |
| 5,563,336 A * | 10/1996 | Mallet | G01M 3/223 | 73/40.7 |
| 6,026,675 A * | 2/2000 | Jansch | G01M 3/2853 | 73/49.1 |
| 6,032,515 A * | 3/2000 | Huber | G01M 3/022 | 73/49.1 |
| 6,073,481 A * | 6/2000 | Barefoot | G01M 3/2861 | 73/49.5 |
| 6,339,953 B1 * | 1/2002 | Ashworth | G01M 3/2823 | 73/40.5 R |
| 6,467,336 B1 * | 10/2002 | Gotowik | G01M 3/2853 | 73/866.5 |
| 6,601,437 B2 * | 8/2003 | Gotowik | G01M 3/022 | 73/40.5 R |
| 6,655,413 B2 * | 12/2003 | Condon | F16L 55/105 | 137/269 |
| 7,118,137 B2 * | 10/2006 | Deremiah | F16L 21/035 | 285/305 |
| 7,240,697 B2 * | 7/2007 | Beebe | G01M 3/022 | 138/93 |
| 7,523,644 B2 * | 4/2009 | Van Winkle | F16L 23/167 | 73/49.3 |
| 7,766,341 B2 * | 8/2010 | Okumura | F16J 15/106 | 277/609 |
| 8,739,607 B2 * | 6/2014 | Slack | G01M 3/2869 | 73/49.1 |
| 9,217,526 B2 * | 12/2015 | Eccleston | G01M 3/283 | |
| 9,463,923 B2 * | 10/2016 | Noyon | F22B 37/221 | |
| 9,488,302 B2 * | 11/2016 | Gjerstad | F16L 23/18 | |
| 9,631,990 B2 * | 4/2017 | Sun | G01M 3/26 | |
| 10,006,570 B2 * | 6/2018 | Yoda | F16L 19/086 | |
| 10,024,753 B2 * | 7/2018 | Rhee | G01M 3/2869 | |
| 10,119,882 B2 * | 11/2018 | Van Nest | G01M 3/2876 | |
| 10,393,614 B2 * | 8/2019 | Miller | G01M 3/2853 | |
| 10,416,037 B2 * | 9/2019 | Miller | G01M 3/2853 | |
| 11,118,715 B2 * | 9/2021 | Al Otaibi | F16L 55/128 | |
| 11,467,056 B2 * | 10/2022 | Meehan | G01M 3/2853 | |
| 11,549,622 B2 * | 1/2023 | Choi | F16J 15/46 | |
| 11,561,151 B2 * | 1/2023 | Van Nest | G01M 3/2876 | |
| 2013/0213121 A1 * | 8/2013 | Sundholm | B29C 65/7802 | 73/49.5 |

FOREIGN PATENT DOCUMENTS

| | | |
|---|---|---|
| JP | 08-062089 A | 3/1996 |
| JP | H08-261867 A | 10/1996 |
| JP | 2013-040866 A | 2/2013 |
| JP | 5722729 B2 * | 5/2015 |
| JP | 2017-007520 A | 1/2017 |

OTHER PUBLICATIONS

International Search Report from corresponding International Patent Application No. PCT/JP2020/012958, dated Jun. 30, 2020.

Office Action issued in corresponding Japanese Patent Application No. 202080023836.7 dated Jan. 26, 2024.

Office Action issued in corresponding Chinese Patent Application No. 202080023836.7 dated Jan. 26, 2024 along with the English-language translation.

* cited by examiner

WATERTIGHT TESTING DEVICE FOR A PIPE JOINT PART

FIELD OF THE INVENTION

The present invention relates to a watertight testing device used for a watertight test of a pipe joint part provided with a seal member between the inner surface of a socket and the outer surface of a spigot with the spigot inserted into the socket.

BACKGROUND OF THE INVENTION

Conventionally, as illustrated in, for example, FIGS. 13 and 14, such a watertight testing device includes a cylindrical body 201 fit into a pipe joint part 200, an annular first water-stop bag 203 that is expandable and shrinkable to provide sealing between the outer surface of one end of the cylindrical body 201 and the inner surface of one pipe 202, an annular second water-stop bag 205 that is expandable and shrinkable to provide sealing between the outer surface of the other end of the cylindrical body 201 and the inner surface of the other pipe 204, an injection pipe 206 for injecting compressed air into the first and second water-stop bags 203 and 205 so as to expand the first and second water-stop bags 203 and 205, and a water filling pipe 208.

The water filling pipe 208 is a pipe for filling a test space 207 with water from the inside of the cylindrical body 201. The test space 207 is formed between the outer surface of the cylindrical body 201 and the inner surfaces of the pipes 202 and 204 in a pipe diameter direction B and between the first water-stop bag 203 and the second water-stop bag 205 in a pipe axial direction A.

With this configuration, as illustrated in FIG. 14, the cylindrical body 201 is set in the pipe joint part 200 with the shrunk first and second water-stop bags 203 and 205. Compressed air is then injected into the first and second water-stop bags 203 and 205 from the injection pipe 206. Thus, as illustrated in FIG. 13, the first and second water-stop bags 203 and 205 are expanded in the pipe diameter direction and are pressed to the inner surfaces of the pipes 202 and 204, so that the first water-stop bag 203 provides sealing between the outer surface of one end of the cylindrical body 201 and the inner surface of one pipe 202, and the second water-stop bag 205 provides sealing between the outer surface of the other end of the cylindrical body 201 and the inner surface of the other pipe 204.

Thereafter, the test space 207 is filled with water from the water filling pipe 208, and then a watertight test is conducted on the pipe joint part 200 by checking the presence or absence of water leakage from an elastic seal member 209 of the pipe joint part 200.

After the completion of the watertight test, water in the test space 207 is drained, compressed air in the first and second water-stop bags 205 is exhausted from the injection pipe 206, the first and second water-stop bags 205 are shrunk as illustrated in FIG. 14, and the cylindrical body 201 is removed from the pipe joint part 200.

See Japanese Patent Laid-Open No. 2013-40866 for a description of such a watertight testing device.

In the conventional form, however, if the first and second water-stop bags 203 and 205 are thin and one of the first and second water-stop bags 203 and 205 is broken when being handled, one of the first and second water-stop bag 203 and 205 may be easily holed. The holed first or second water-stop bag 203 or 205 is not sufficiently expanded, disadvantageously reducing sealing performance between the outer surface of the cylindrical body 201 and the inner surfaces of the pipes 202 and 204.

If the first and second water-stop bags 203 and 205 are increased in thickness to be hardly holed, the first and second water-stop bags 203 and 205 are less likely to be deformed and expanded. Unfortunately, this may reduce sealing performance between the outer surface of the cylindrical body 201 and the inner surfaces of the pipes 202 and 204 when a watertight test is conducted.

SUMMARY OF THE INVENTION

An object of the present invention is to provide a watertight testing device that can improve sealing performance between the outer surface of a core and the inner surface of a pipe when a watertight test is conducted.

A watertight testing device for conducting a watertight test on a pipe joint part according to the present invention, in which a socket of one pipe receives an inserted spigot of the other pipe, the pipe joint part being provided with a seal member between the inner surface of the socket and the outer surface of the spigot, the watertight testing device including:
  a cylindrical core fit into the pipe joint part;
  an annular first seal member for sealing between the outer surface of the core and the inner surface of the one pipe;
  an annular second seal member for sealing between the outer surface of the core and the inner surface of the other pipe;
  a first pressing member for pressing and compressing the first seal member into a first seal-member insertion space formed between the outer surface of the core and the inner surface of the one pipe;
  a second pressing member for pressing and compressing the second seal member into a second seal-member insertion space formed between the outer surface of the core and the inner surface of the other pipe;
  a moving device for moving the first and second pressing members in a pipe axial direction; and
  a test fluid feeder for feeding a test fluid into a test space between the outer surface of the core and the inner surface of the one and other pipe in a pipe diameter direction and between the first seal member and the second seal member in the pipe axial direction.

According to the watertight testing device of the present invention, it is preferable that the first seal-member insertion space is reduced in the pipe diameter direction along a pressing direction of the first seal member,
  the second seal-member insertion space is reduced in the pipe diameter direction along a pressing direction of the second seal member,
  the first seal member is compressed in the pipe diameter direction while being pressed into the first seal-member insertion space, and
  the second seal member is compressed in the pipe diameter direction while being pressed into the second seal-member insertion space.

According to the watertight testing device of the present invention, it is preferable that the moving device moves the first pressing member and the second pressing member in a pressing direction that moves the pressing members toward each other in the pipe axial direction and a release direction that moves the pressing members away from each other in the pipe axial direction.

According to the watertight testing device of the present invention, it is preferable that the first seal member and the first pressing member are engaged with each other in the pipe axial direction, and the second seal member and the second pressing member are engaged with each other in the pipe axial direction.

According to the watertight testing device of the present invention, it is preferable that the moving device includes a movable rod that is attached to one of the first pressing member and the second pressing member and is movable in the pipe axial direction, a receiving member provided on the movable rod, and an extendable drive that is extendable in the pipe axial direction, the movable rod penetrates the core from one of the pressing members, is inserted into the other pressing member, and penetrates the backside of the other pressing member on the opposite side from the one of the pressing members, the receiving member and the other pressing member are opposed to each other from the backside of the other pressing member in the pipe axial direction, and the extendable drive is attached to the other pressing member and the receiving member.

According to the watertight testing device of the present invention, it is preferable that when the first and second pressing members each move in the release direction and return to a release position, the first and second seal members are released, and the core is provided with a moving-range regulating member that limits an excessive movement of the first and second pressing members beyond the release position in the release direction.

The watertight testing device of the present invention further includes a plurality of wheels for movement in one of the pipes and the other pipe, wherein the wheels are omni wheels rotatable in the pipe axial direction and a pipe circumferential direction.

As has been discussed, according to the present invention, the core is set in the pipe joint part, and the moving device moves the first and second pressing members in the pipe axial direction, so that the first pressing member presses and compresses the first seal member into the first seal-member insertion space, and the second pressing member presses and compresses the second seal member into the second seal-member insertion space. Thus, the compressed first seal member provides sufficient sealing between the outer surface of the core and the inner surface of the one pipe, and the compressed second seal member provides sufficient sealing between the outer surface of the core and the inner surface of the other pipe, thereby improving seal performance between the outer surface of the core and the inner surface of the pipe.

Thereafter, the test fluid is fed into the test space by the test fluid feeder, and a watertight test is conducted on the pipe joint part by checking, for example, the presence or absence of leakage of the test fluid from the seal member of the pipe joint part.

DETAILED DESCRIPTION OF THE INVENTION

Embodiments of the present invention will be described below with reference to the accompanying drawings.

Figure 1:
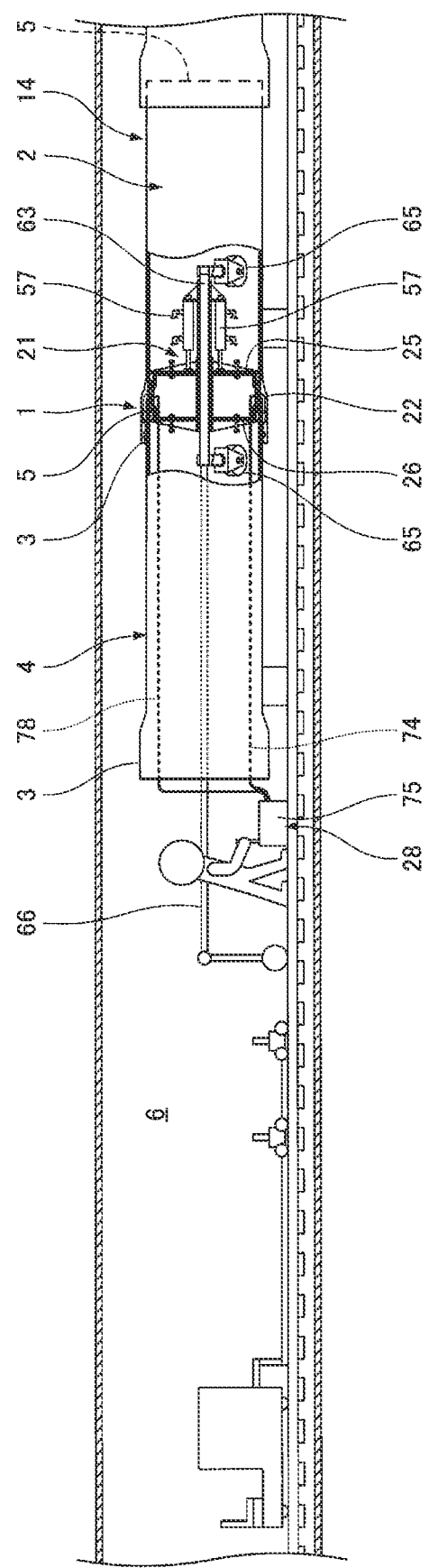
FIG. 1 illustrates a watertight test conducted on a pipe joint part by using a watertight testing device according to a first embodiment of the present invention.

In a first embodiment, as illustrated in FIG. 1, reference numeral 1 denotes a pipe joint where a socket 3 of one pipe 2 receives an inserted spigot 5 of the other pipe 4. The pipes 2 and 4 are, for example, PN pipes made of ductile. The pipes 2 and 4 are disposed to be joined to each other in a pipeline construction shaft 6 formed in the ground and constitute a pipeline 14.

Figure 2:
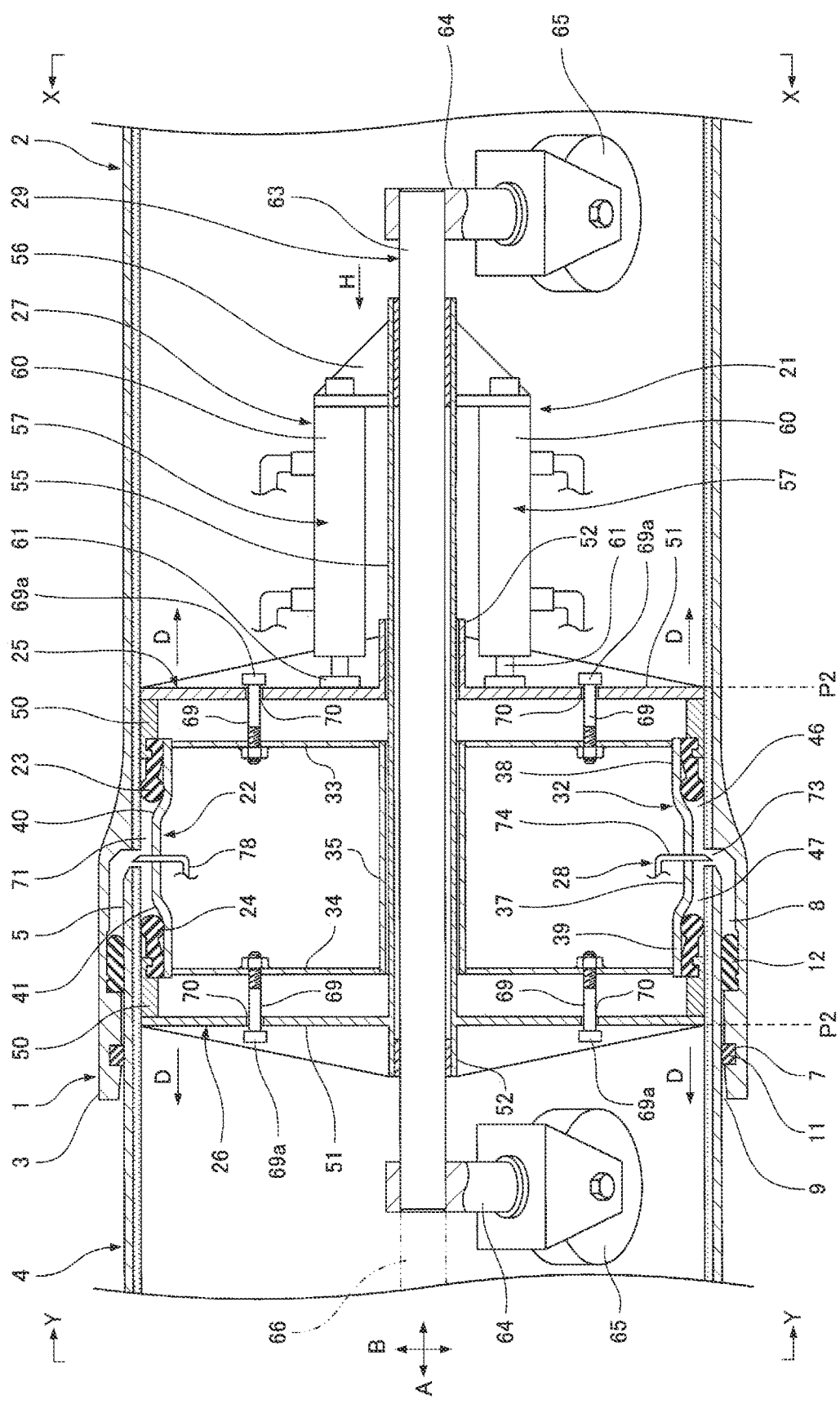
FIG. 2 is a cross-sectional view of the watertight testing device with released first and second seal members according to the first embodiment of the present invention.

As illustrated in FIG. 2, the inner surface of the socket 3 has a lock-ring storage groove 7 and a seal-member attachment recess 8. The lock-ring storage groove 7 is located between the seal-member attachment recess 8 and an opening end 9 of the socket 3 in a pipe axial direction A.

The lock-ring storage groove 7 accommodates a lock ring 11 for preventing removal. In the seal-member attachment recess 8, an annular seal member 12 made of an elastic material such as rubber is attached. The seal member 12 is interposed between the inner surface of the socket 3 and the outer surface of the spigot 5 and is compressed in a pipe diameter direction B. This provides sealing between the socket 3 and the spigot 5.

Reference numeral 21 denotes a watertight testing device of the pipe joint 1. The watertight testing device 21 is configured as follows:

The watertight testing device 21 includes a core 22, first and second seal members 23 and 24, first and second pressing members 25 and 26, a moving device 27, a test fluid feeder 28, and a support member 29.

Figure 3:
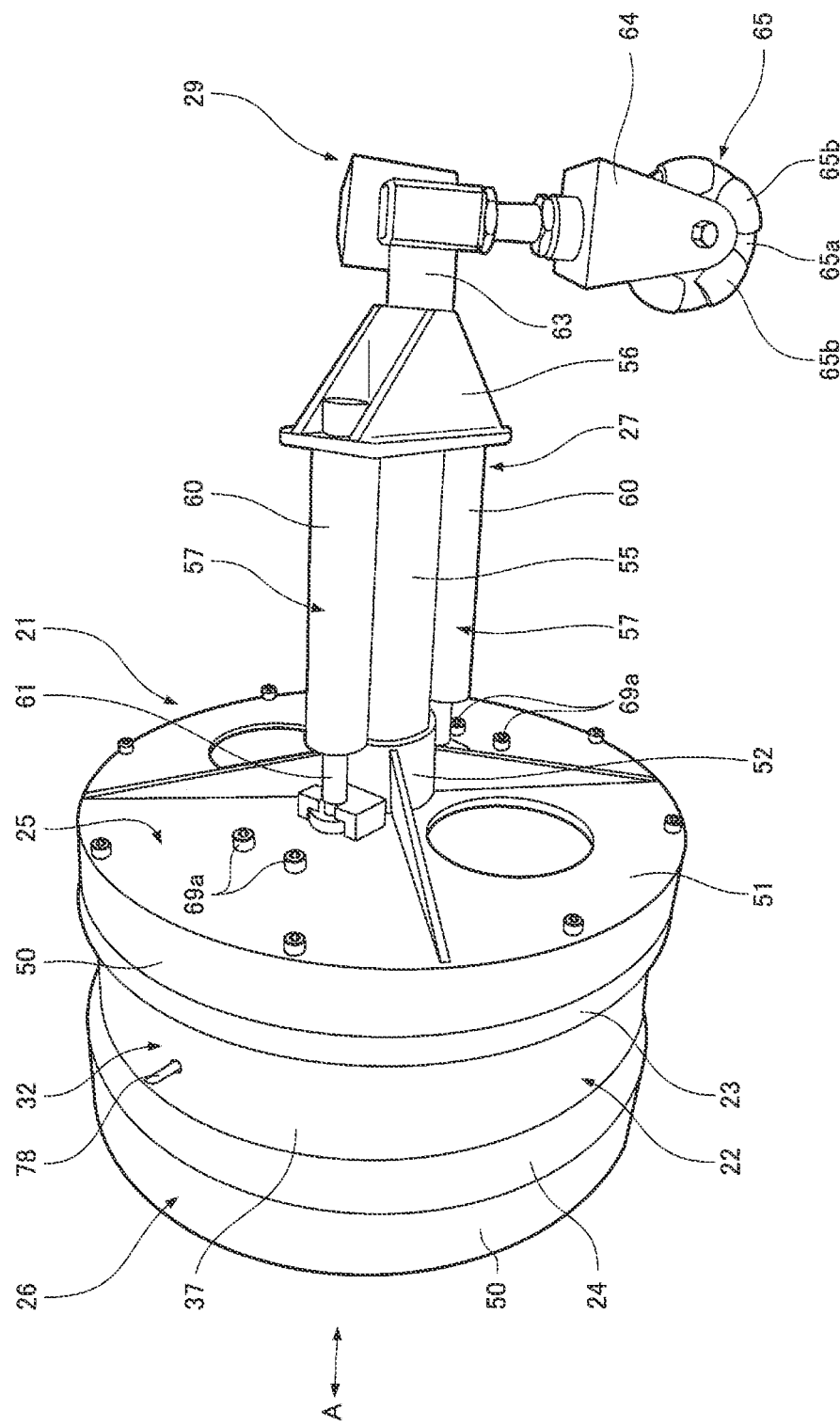
FIG. 3 is a perspective view of the watertight testing device according to the first embodiment of the present invention.
Figure 4:
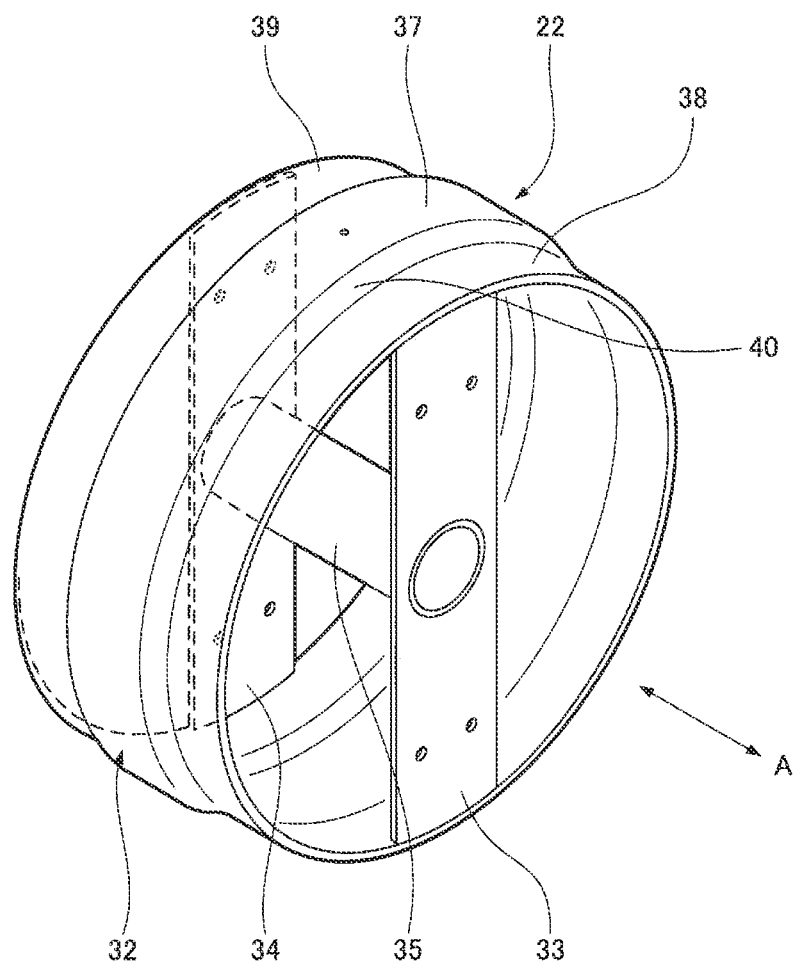
FIG. 4 is a perspective view illustrating a core for the watertight testing device according to the first embodiment of the present invention.

As illustrated in FIGS. 2 to 4, the core 22 includes a cylindrical body 32 fit into the pipe joint 1, a pair of support plates 33 and 34 provided on both ends of the body 32, and a short pipe 35 provided between the support plates 33 and 34.

Figure 5:
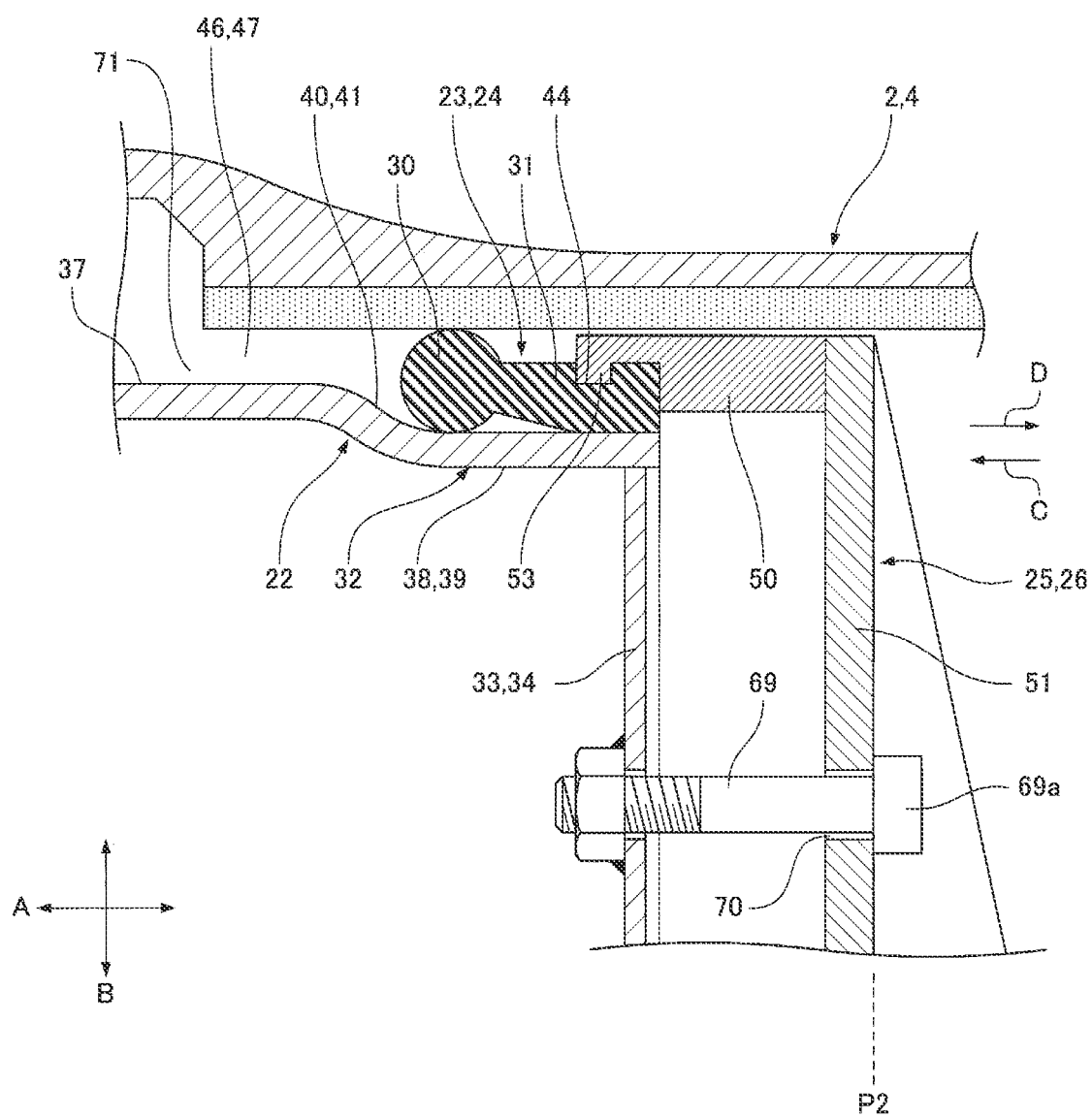
FIG. 5 is an enlarged cross-sectional view illustrating the first and second seal members of the watertight testing device according to the first embodiment of the present invention, the first and second seal members being released.
Figure 6:
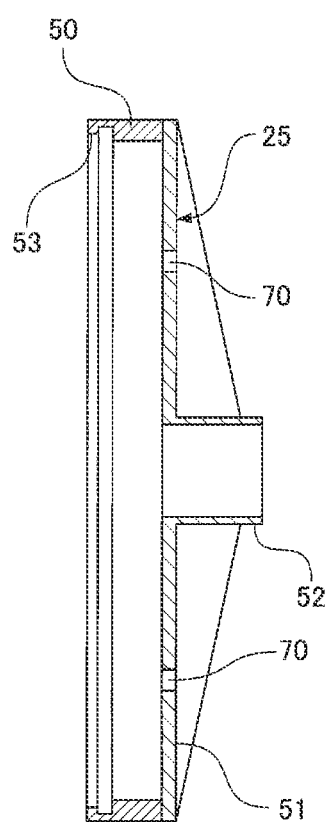
FIG. 6 is a cross-sectional view of a first pressing member for the watertight testing device according to the first embodiment of the present invention.
Figure 7:
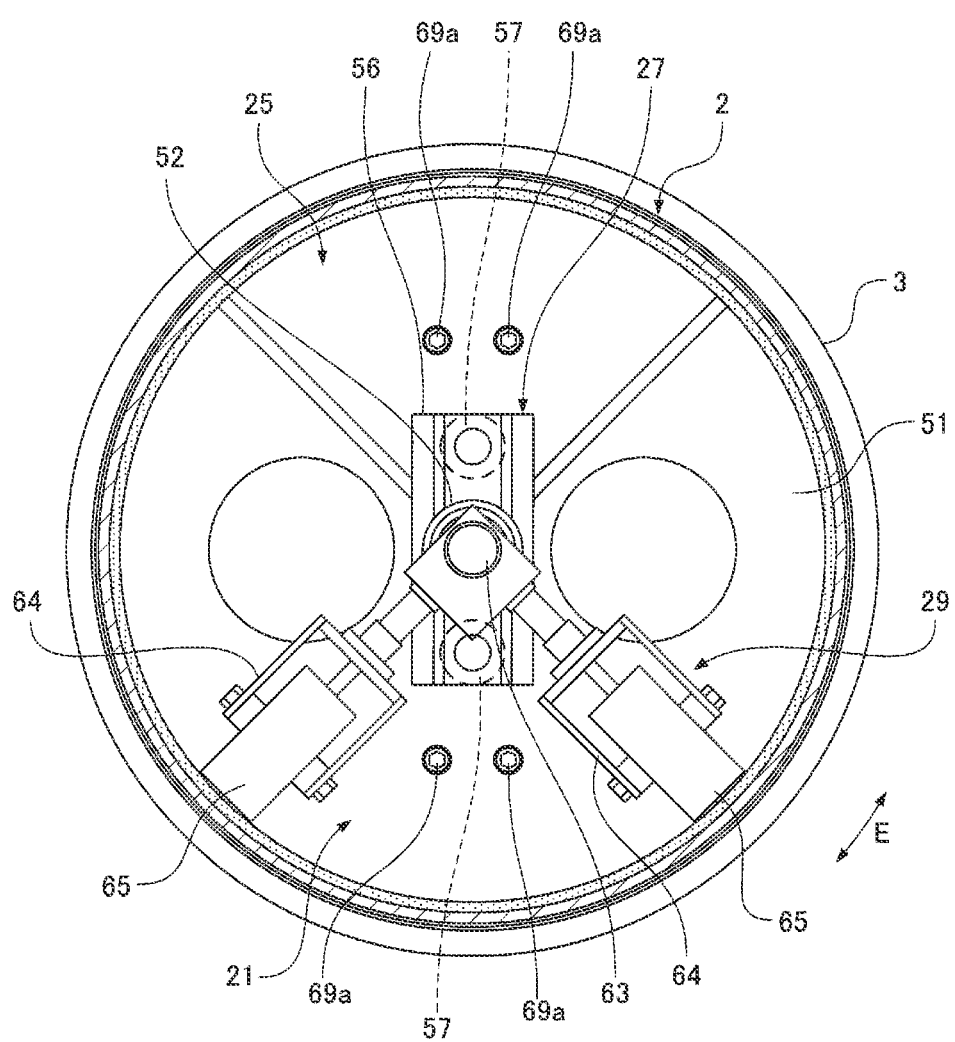
FIG. 7 is a cross-sectional view taken along line X-X of FIG. 2.

The body 32 has an extended part 37, which extends outward in the pipe diameter direction B, at the center in the pipe axial direction A. The outer diameter of the extended part 37 is set larger than the outer diameters of both ends 38 and 39 of the body 32 in the pipe axial direction A. As illustrated in FIGS. 2 and 5, a pair of tapered surfaces 40 and 41 that gradually increase in diameter from the ends 38 and 39 to the extended part 37 are circumferentially formed at the boundaries between the outer surfaces of the ends 38 and 39 of the body 32 and the outer surface of the extended part 37.

The support plates 33 and 34 are opposed to each other in the pipe axial direction A. The short pipe 35 is disposed at the center in the body 32 such that the body 32 and the short pipe 35 are coaxially arranged.

The first seal member 23 is an annular member made of an elastic material such as rubber and provides sealing between the outer surface of the core 22 and the inner surface of the one pipe 2. The second seal member 24 is an annular member made of an elastic material such as rubber and provides sealing between the outer surface of the core 22 and the inner surface of the other pipe 4.

The first and second seal members 23 and 24 each have a valve part 30 circular in cross section and a proximal-end part 31 rectangular in cross section. The hardness of the proximal-end part 31 is set higher than that of the valve part 30. The first and second seal members 23 and 24 each have an engagement recess 44 circumferentially formed on the outer surface of the proximal-end part 31.

Between the outer surface of the core 22 and the inner surface of the one pipe 2, a first seal-member insertion space 46 is circumferentially formed. Between the outer surface of the core 22 and the inner surface of the other pipe 4, a second seal-member insertion space 47 is circumferentially formed.

As illustrated in FIGS. 2, 3, and 5 to 7, the first pressing member 25 presses and compresses the first seal member 23 into the first seal-member insertion space 46. The first pressing member 25 includes a cylindrical pressing part 50, a disk part 51 provided on the pressing part 50, a circular short cylinder 52 provided at the center of the disk part 51, and an engagement protrusion 53 circumferentially formed on the inner surface of the pressing part 50.

As illustrated in FIGS. 2, 3, 5, 8, and 9, the second pressing member 26 presses and compresses the second seal member 24 into the second seal-member insertion space 47. The second pressing member 26 includes a pressing part 50, a disk part 51, a short cylinder 52, and an engagement protrusion 53 like the first pressing member 25. The disk part 51 has circular holes 54.

Figure 10:
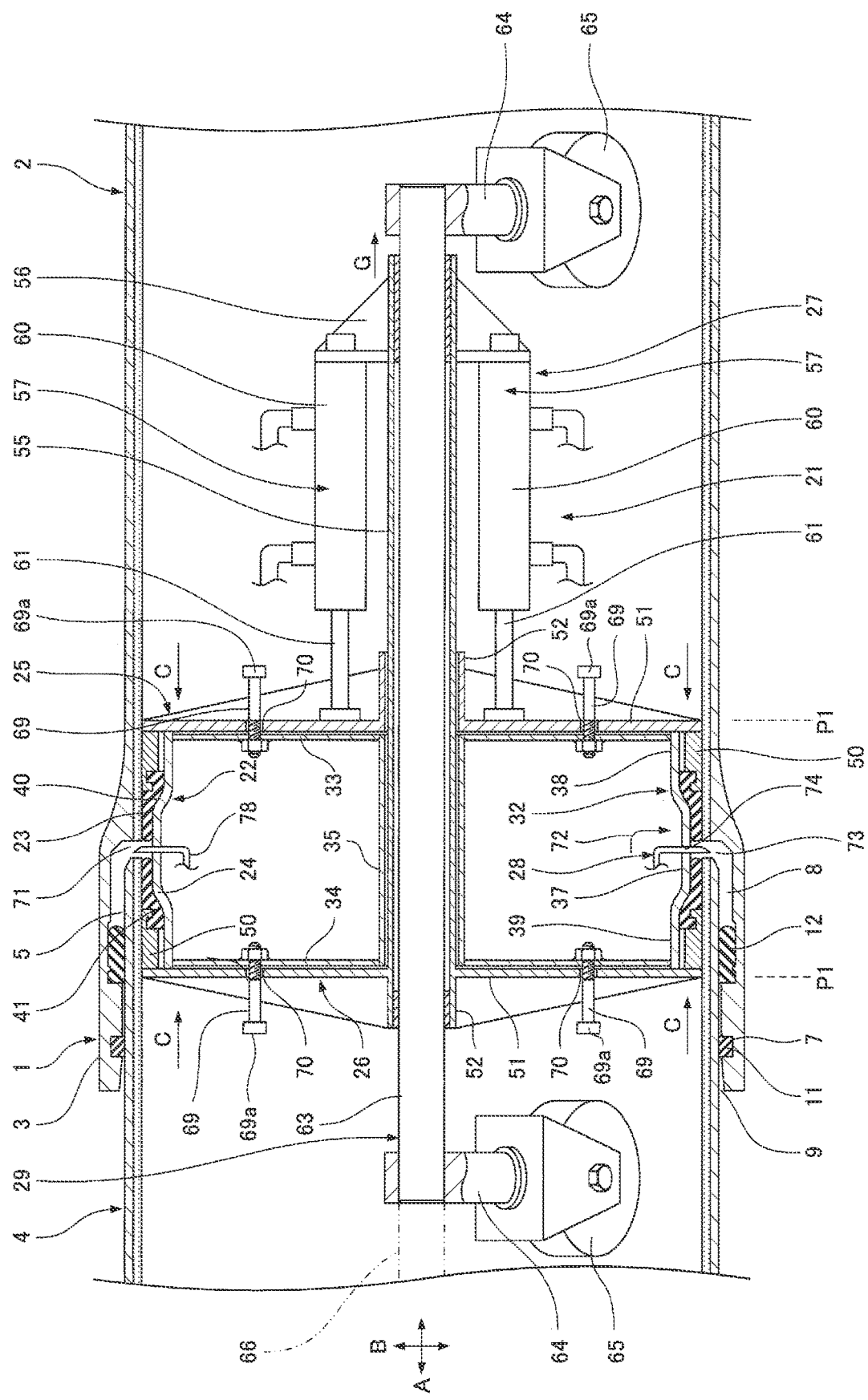
FIG. 10 is a cross-sectional view of the watertight testing device with the pressed first and second seal members according to the first embodiment of the present invention.
Figure 11:
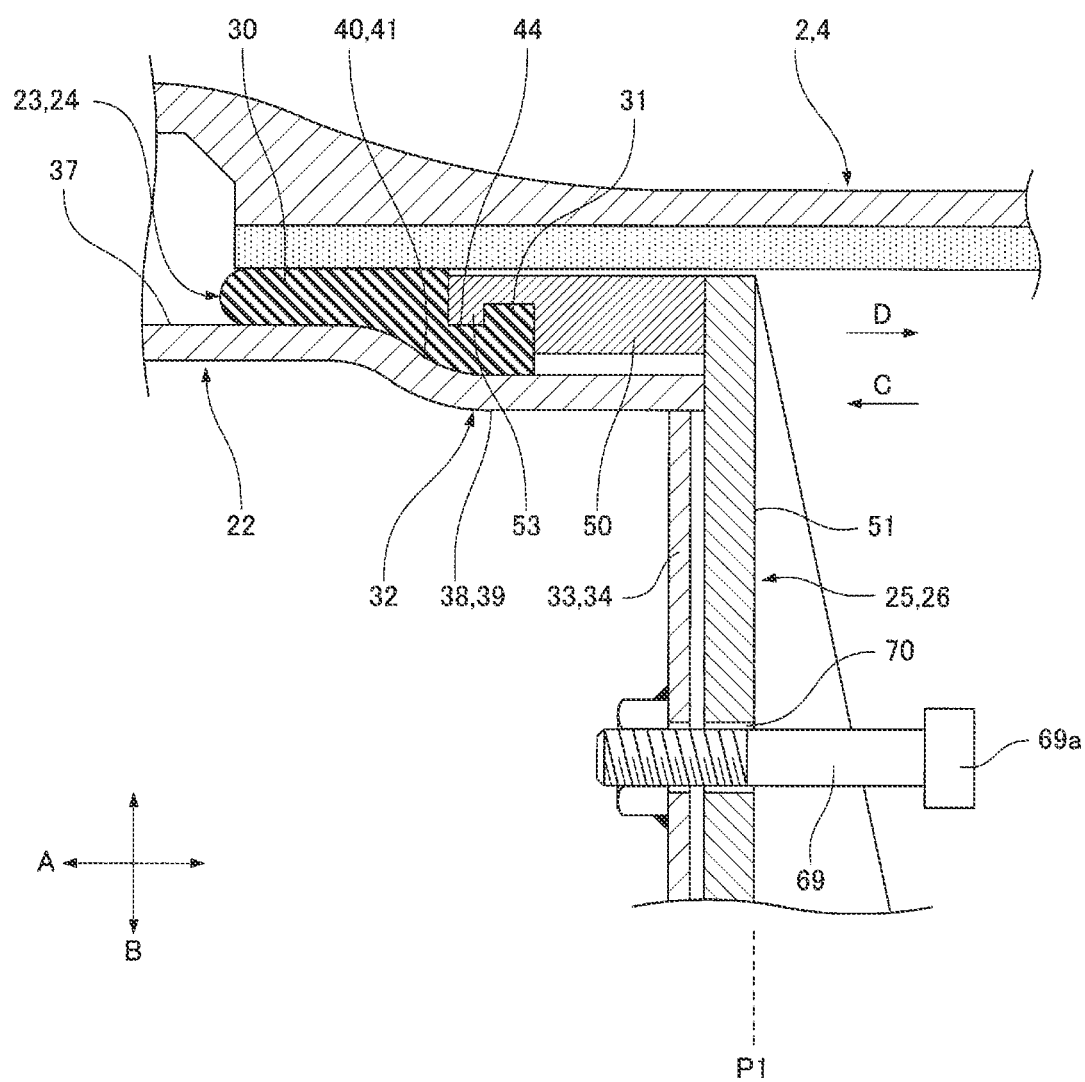
FIG. 11 is an enlarged cross-sectional view illustrating the first and second seal members of the watertight testing device, the first and second seal members being pressed according to the first embodiment of the present invention.

In a part where the tapered surface 40 is formed, the first seal-member insertion space 46 is reduced in the pipe diameter direction B along a pressing direction C of the first seal member 23. Moreover, in a part where the tapered surface 41 is formed, the second seal-member insertion space 47 is reduced in the pipe diameter direction B along a pressing direction C of the second seal member 24. Thus, as illustrated in FIGS. 10 and 11, the first seal member 23 is compressed in the pipe diameter direction B while being pressed into the first seal-member insertion space 46, whereas the second seal member 24 is compressed in the pipe diameter direction B while being pressed into the second seal-member insertion space 47.

As illustrated in FIGS. 2 and 5, the engagement protrusion 53 of the first pressing member 25 is fit into the engagement recess 44 of the first seal member 23, allowing the first seal member 23 and the first pressing member 25 to engage with each other in the pipe axial direction A. Furthermore, the engagement protrusion 53 of the second pressing member 26 is fit into the engagement recess 44 of the second seal member 24, allowing the second seal member 24 and the second pressing member 26 to engage with each other in the pipe axial direction A.

The moving device 27 moves the first pressing member 25 and the second pressing member 26 in the pressing direction C (FIG. 10) that moves the pressing members toward each other in the pipe axial direction A and a release direction D (FIG. 2) that moves the pressing members away from each other in the pipe axial direction A.

Figure 8:
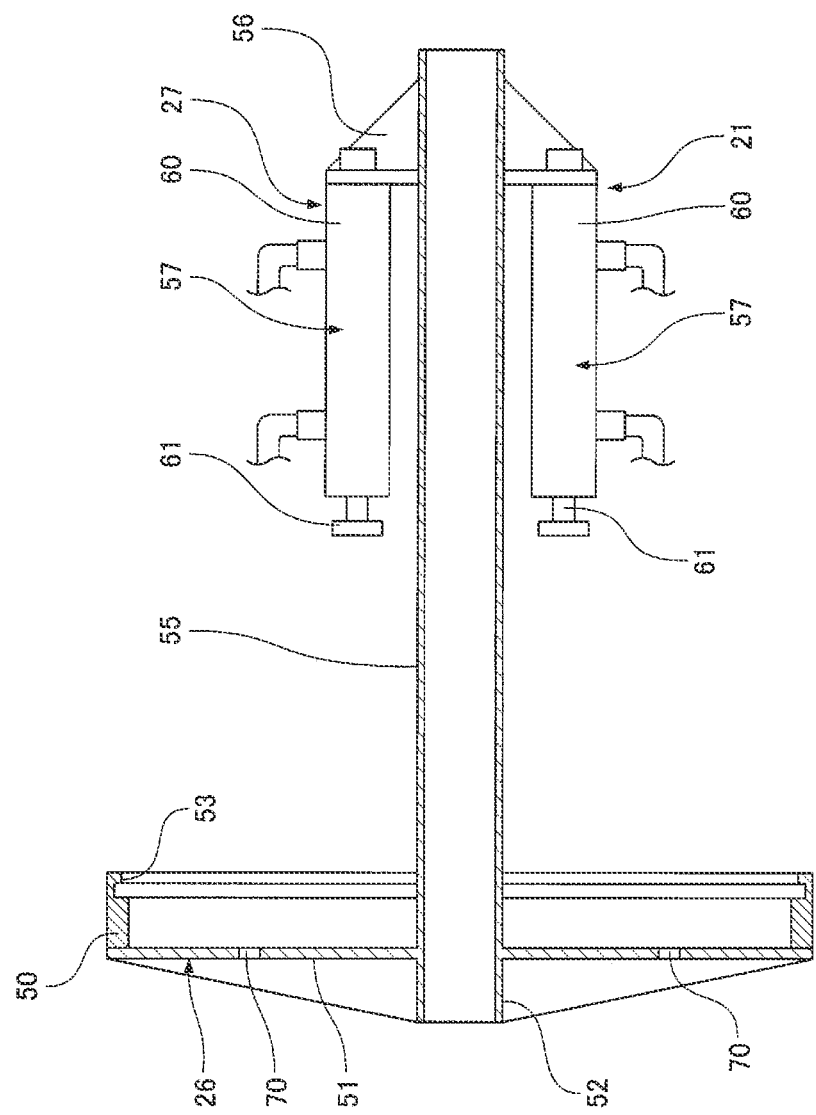
FIG. 8 is a cross-sectional view of a second pressing member and a moving device for the watertight testing device according to the first embodiment of the present invention.

As illustrated in FIGS. 2, 3, and 8, the moving device 27 includes a movable rod 55 that is attached to the second pressing member 26 and is movable in the pipe axial direction A, a receiving member 56 provided on the distal end of the movable rod 55, and a plurality of double-acting jacks 57 (an example of an extendable drive) that are extendable in the pipe axial direction A.

The movable rod 55 is a cylindrical member that is inserted from the second pressing member 26 into the short pipe 35, penetrates the core 22, is inserted into the short cylinder 52, is inserted into the first pressing member 25, and penetrates the backside of the first pressing member 25 on the opposite side from the second pressing member 26. The receiving member 56 is opposed to the backside of the first pressing member 25 in the pipe axial direction A. The double-acting jacks 57 are attached between the first pressing member 25 and the receiving member 56.

The double-acting jack 57 includes a jack body 60 and an extendable plunger 61. The jack body 60 is attached to the receiving member 56 while the tip of the plunger 61 is attached to the first pressing member 25.

As illustrated in FIGS. 2, 3, 7, and 9, the support member 29 is a member for supporting the core 22, the first and second pressing members 25 and 26, and the moving device 27. The support member 29 includes a shaft body 63 inserted into the movable rod 55, a plurality of leg frames 64 provided on both ends of the shaft body 63, and wheels 65 provided on the lower ends of the leg frames 64.

Two of the leg frames 64 are provided at 90° from each other on each end of the shaft body 63 in a pipe circumferential direction E. As illustrated in FIG. 3, the wheels 65 are omni wheels, each including a wheel body 65a and a plurality of small auxiliary wheels 65b provided around the wheel body 65a. The wheels 65 are movable in the rotation direction of the wheel body 65a and a direction orthogonal to the rotation direction.

As illustrated in FIGS. 1 and 2, an operation bar 66 for moving the watertight testing device 21 from a remote location is detachably connected to the rear and of the support member 29.

As illustrated in FIGS. 10 and 11, when the first and second pressing members 25 and 26 each move in the pressing direction C and reach a pressing position P1, the disk parts 51 of the first and second pressing members 25 and 26 are each brought into contact with one end of the body 32 of the core 22 and stop the first and second pressing members 25 and 26.

As illustrated in FIGS. 2 and 5, when the first and second pressing members 25 and 26 each move in the release direction D and return to a release position P2, the first and second seal members 23 and 24 are released. The support plates 33 and 34 of the core 22 are each provided with a plurality of moving-range regulating members 69 that limit an excessive movement of each of the first and second pressing members 25 and 26 beyond the release position P2 in the release direction D. The moving-range regulating members 69 are, for example, bolts with heads 69a. The moving-range regulating members 69 are inserted into through holes 70 formed on the disk parts 51 of the first and second pressing members 25 and 26.

When the watertight testing device 21 is set in the pipe joint 1, a test space 71 is circumferentially formed between the outer surface of the core 22 and the inner surfaces of the pipes 2 and 4 in the pipe diameter direction B and between the first seal member 23 and the second seal member 24 in the pipe axial direction A. The test space 71 communicates with the seal-member attachment recess 8 via a gap 73 between the rear end of the socket 3 and the distal end of the spigot 5.

As illustrated in FIGS. 1 and 2, the test fluid feeder 28 is a device for feeding water 72 (an example of a test fluid) into the test space 71 from the inside of the core 22. The test fluid feeder 28 includes a feeding hose 74 connected to the lower part of the inner periphery of the body 32, and a hydraulic pump 75 provided on the distal end of the feeding hose 74.

Figure 9:
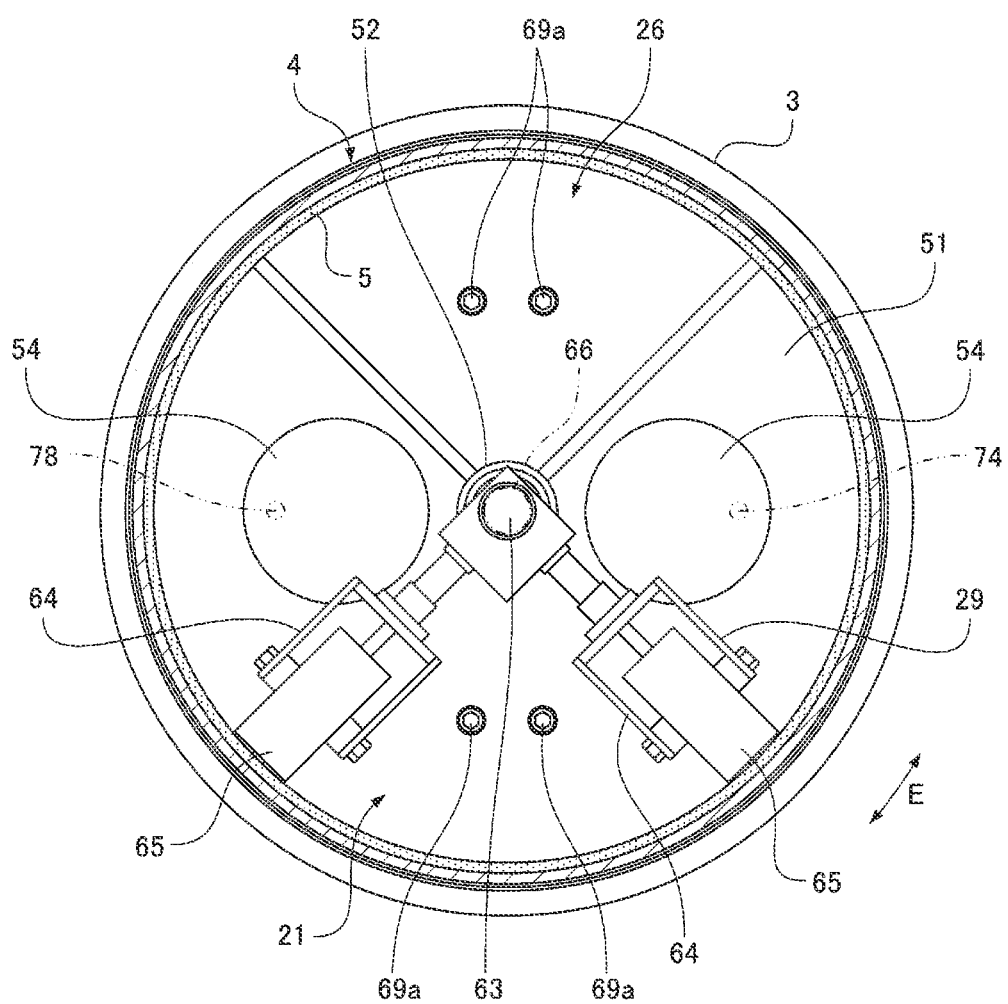
FIG. 9 is a cross-sectional view taken along line Y-Y of FIG. 2.

Connected to the upper part of the inner periphery of the body 32 of the core 22 is an air bleeding hose 78 for bleeding air in the test space 71. As illustrated in FIG. 9, the feeding hose 74 and the air bleeding hose 78 pass through the holes 54 on the disk parts 51 of the second pressing member 26.

A watertight test method for conducting a watertight test on the pipe joint 1 by using the watertight testing device 21 will be described below.

As illustrated in FIGS. 1 and 2, the spigot 5 is inserted into the socket 3 so as to join the one pipe 2 to the other pipe 4. After that, the plungers 61 of the double-acting jacks 57 of the watertight testing device 21 are retracted to return the first and second pressing members 25 and 26 to the release position P2. In this state, the operation bar 66 is pushed and pulled to move the watertight testing device 21 in the pipe axial direction A to the inside of the pipe joint 1.

Thereafter, as illustrated in FIG. 10, the plungers 61 of the double-acting jacks 57 are extended to move the first pressing member 25 in the pressing direction C to the pressing position P1 and move the movable rod 55 of the moving device 27 in an opposite direction G to the first pressing member 25. Thus, the second pressing member 26 moves in the pressing direction C to the pressing position P1.

Thus, as illustrated in FIG. 11, the first pressing member 25 presses and compresses the first seal member 23 into the first seal-member insertion space 46, and the second pressing member 26 presses and compresses the second seal member 24 into the second seal-member insertion space 47. This allows the compressed first seal member 23 to provide sufficient sealing between the outer surface of the core 22 and the inner surface of the one pipe 2 and the compressed second seal member 24 to provide sufficient sealing between the outer surface of the core 22 and the inner surface of the other pipe 4. Thus, seal performance improves between the outer surface of the core 22 and the inner surfaces of the pipes 2 and 4.

At this point, the first and second seal-member insertion spaces 43 and 44 are reduced in the formation parts of the tapered surfaces 40 and 41 in the pipe diameter direction B. Thus, the first seal member 23 is compressed in the pipe diameter direction B while being pressed into the first seal-member insertion space 46, whereas the second seal member 24 is compressed in the pipe diameter direction B while being pressed into the second seal-member insertion space 47. This can easily and securely compress the first and second seal members 23 and 24.

Thereafter, the hydraulic pump 75 is driven to feed the water 72 into the test space 71 from the feeding hose 74. This fills the seal-member attachment recess 8 with the water 72, which is fed into the test space 71, through the gap 73 while bleeding air in the test space 71 and the seal-member attachment recess 8 through the air bleeding hose 78. In a state where the test space 71 and the seal-member attachment recess 8 are filled with the water 72 at a predetermined pressure, a watertight test is conducted on the pipe joint 1 by checking, for example, the presence or absence of leakage of the water 72 from the seal member 12.

After the completion of the watertight test, the water 72 in the test space 71 and the seal-member attachment recess 8 is drained. Thereafter, as illustrated in FIGS. 2 and 5, the plungers 61 of the double-acting jacks 57 are retracted to move and return the first pressing member 25 in the release direction D to the release position P2 and move the movable rod 55 of the moving device 27 in an opposite direction H to the first pressing member 25. Thus, the second pressing member 26 moves in the release direction D to the release position P2.

At this point, the first seal member 23 is engaged with the first pressing member 25 via the engagement recess 44 and the engagement protrusion 53 and thus securely moves integrally with the first pressing member 25 in the release direction D. This releases the first seal member 23.

The second seal member 24 is engaged with the second pressing member 26 via the engagement recess 44 and the engagement protrusion 53 and thus securely moves integrally with the second pressing member 26 in the release direction D. This releases the second seal member 24.

When the first pressing member 25 returns to the release position P2, the disk part 51 of the first pressing member 25 comes into contact with the heads 69a of the moving-range regulating members 69. When the second pressing member 26 returns to the release position P2, the disk part 51 of the second pressing member 26 comes into contact with the heads 69a of the moving-range regulating members 69.

This can prevent the first and second pressing members 25 and 26 from excessively moving beyond the release position P2 in the release direction D. Thus, the first and second pressing members 25 and 26 can be easily and accurately returned to the release position P2.

The hardness of the proximal-end parts 31 of the first and second seal members 23 and 24 is set higher than that of the valve part 30, and the engagement recess 44 is formed on the proximal-end part 31. Thus, the proximal-end parts 31 are hardly deformed when the first and second seal members 23 and 24 move, thereby securely moving the first and second seal members 23 and 24.

Thereafter, by pushing and pulling the operation bar 66, the watertight testing device 21 is moved in the pipe axial direction A and is collected from the inside of the pipe joint 1. At this point, as illustrated in FIGS. 2 and 5, the first and second pressing members 25 and 26 are returned to the release position P2 and release the first and second seal members 23 and 24, thereby easily moving the watertight testing device 21. Since the wheels 65 for movements are omni wheels, the watertight testing device 21 can easily move in the pipes 2 and 4 in the pipe axial direction A and the pipe circumferential direction E, so that the watertight testing device 21 can be easily removed from the pipe joint 1.

In the watertight testing device 21, the first and second pressing members 25 and 26 can be moved in the pressing direction C and the release direction D by using the double-acting jacks 57 shared by the first and second pressing members 25 and 26, thereby reducing the kinds and the number of double-acting jacks 57.

In the first embodiment, as illustrated in FIG. 5, the engagement recess 44 is formed on each of the first and second seal members 23 and 24 while the engagement protrusion 53 is formed on each of the first and second pressing members 25. The engagement protrusion 53 may be formed on each of the first and second seal members 23 and 24, and the engagement recess 44 may be formed on each of the first and second pressing members 25.

In the first embodiment, as illustrated in FIG. 5, the engagement protrusion 53 of the first pressing member 25 is fit into the engagement recess 44 of the first seal member 23. This engages the first seal member 23 and the first pressing member 25 in the pipe axial direction A and fits the engagement protrusion 53 of the second pressing member 26 into the engagement recess 44 of the second seal member 24, so that the second seal member 24 and the second pressing member 26 are engaged with each other in the pipe axial direction A. However, the present invention is not limited to this configuration. For example, a second embodiment discussed below may be applied instead.

Figure 12:
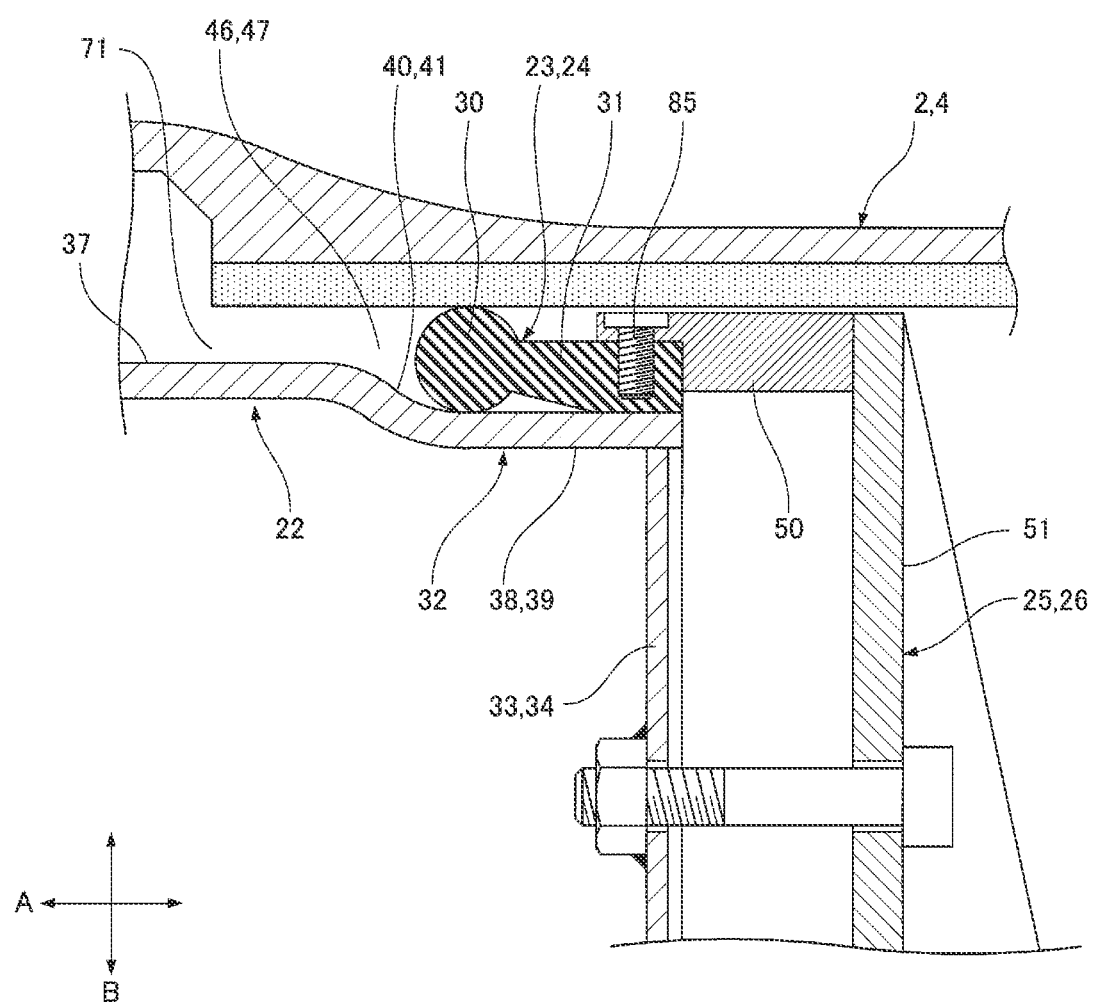
FIG. 12 is an enlarged cross-sectional view illustrating first and second seal members for a watertight testing device according to a second embodiment of the present invention.
Figure 13:
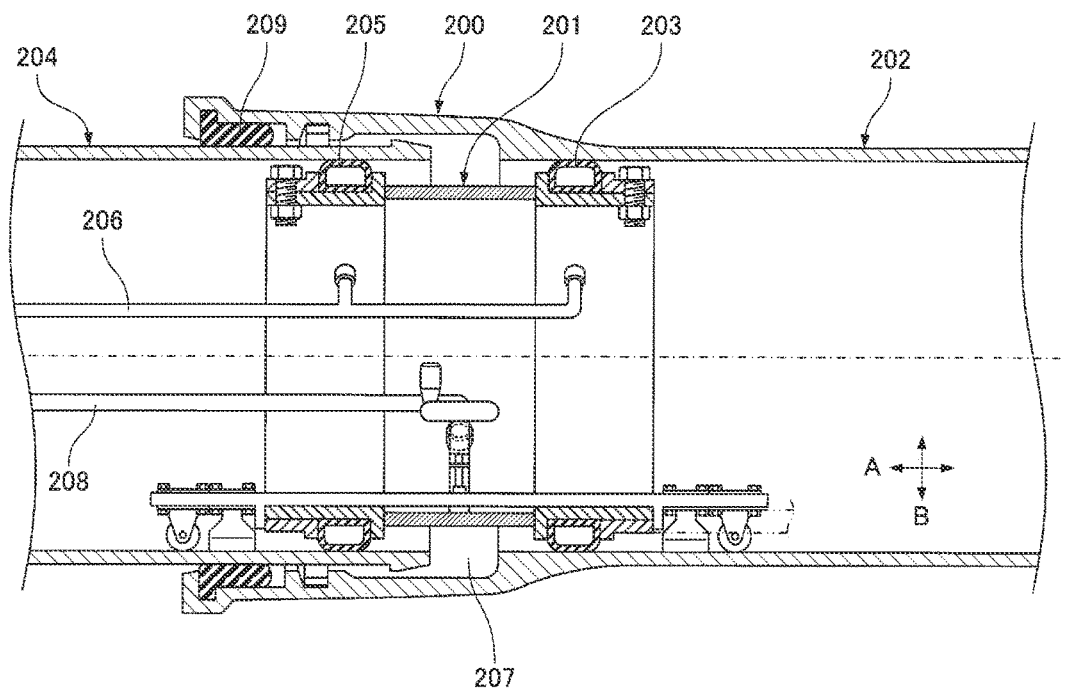
FIG. 13 is a cross-sectional view of a conventional watertight testing device.
Figure 14:
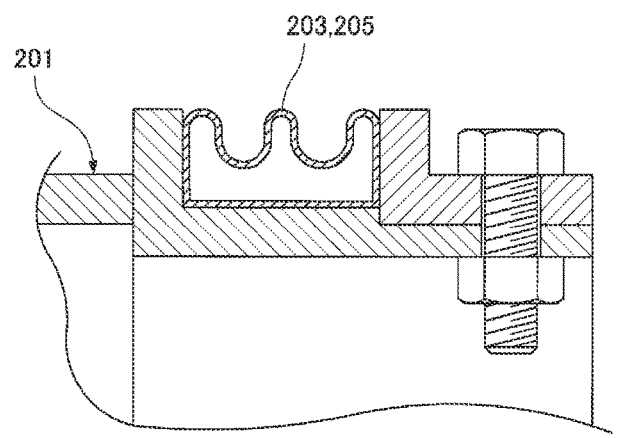
FIG. 14 is an enlarged cross-sectional view illustrating first and second water-stop bags for the conventional watertight testing device.

In the second embodiment, as illustrated in FIG. 12, a pressing part 50 of a first pressing member 25 and a proximal-end part 31 of a first seal member 23 are connected to each other with a plurality of screws 85, thereby engaging the first seal member 23 and the first pressing member 25 in a pipe axial direction A. Likewise, a pressing part 50 of a second pressing member 26 and a proximal-end part 31 of a second seal member 24 are connected to each other with a plurality of screws 85, thereby engaging the second seal member 24 and the second pressing member 26 in the pipe axial direction A.

In the foregoing embodiments, as illustrated in FIG. 2, the movable rod 55 is attached to the second pressing member 26 and penetrates the backside of the first pressing member 25, and the receiving member 56 is opposed to the first pressing member 25. The movable rod 55 may be attached to the first pressing member 25 and penetrate the back side of the second pressing member 26, and the receiving member 56 may be opposed to the back side of the second pressing member 26.

In the foregoing embodiments, the double-acting jack 57 is an example of an extendable drive. Multiple single-acting jacks in different orientations may be used instead. Alternatively, a hydraulic cylinder or the like may be used.

In the foregoing embodiments, the feeding hose 74 and the air bleeding hose 78 are connected to the core 22. The hoses may be replaced with a pipe arrangement or the like.

What is claimed is:

1. A watertight testing device for conducting a watertight test on a pipe joint part in which a socket of one pipe receives an inserted spigot of another pipe, the pipe joint part being provided with a seal member between an inner surface of the socket and an outer surface of the inserted spigot, the watertight testing device comprising:
    a cylindrical core fitted into the pipe joint part;
    an annular first seal member for sealing between an outer surface of the cylindrical core and an inner surface of the one pipe;
    an annular second seal member for sealing between the outer surface of the cylindrical core and an inner surface of the other pipe;
    a first pressing member for pressing and compressing the annular first seal member into a first seal-member insertion space formed between the outer surface of the cylindrical core and the inner surface of the one pipe;
    a second pressing member for pressing and compressing the annular second seal member into a second seal-member insertion space formed between the outer surface of the cylindrical core and the inner surface of the other pipe;
    a moving device for moving the first and second pressing members in a pipe axial direction; and
    a test fluid feeder for feeding a test fluid into a test space formed between the outer surface of the cylindrical core and the inner surfaces of the one pipe and the other pipe in a pipe diameter direction and between the annular first seal member and the annular second seal member in the pipe axial direction,
    wherein a first engagement recess formed in the annular first seal member is engaged with a first engagement protrusion of a first pressing part of the first pressing member, and
    wherein a second engagement recess formed in the annular second seal member is engaged with a second engagement protrusion of a second pressing part of the second pressing member.

2. The watertight testing device for a pipe joint part according to claim 1, wherein the first seal-member insertion space is reduced in the pipe diameter direction along a pressing direction of the annular first seal member,
    wherein the second seal-member insertion space is reduced in the pipe diameter direction along a pressing direction of the annular second seal member,
    wherein the annular first seal member is compressed in the pipe diameter direction while being pressed into the first seal-member insertion space, and
    wherein the annular second seal member is compressed in the pipe diameter direction while being pressed into the second seal-member insertion space.

3. The watertight testing device for a pipe joint part according to claim 1, wherein the moving device moves the first pressing member and the second pressing member in a pressing direction that moves the pressing members toward each other in the pipe axial direction and a release direction that moves the pressing members away from each other in the pipe axial direction.

4. The watertight testing device for a pipe joint part according to claim 1, wherein the moving device comprises:
    a movable rod that is attached to one of the first pressing member and the second pressing member and is movable in the pipe axial direction;
    a receiving member provided on the movable rod; and
    an extendable drive that is extendable in the pipe axial direction,
    wherein, the movable rod penetrates the cylindrical core from the one of the first pressing member and the second pressing member, is inserted into another one of the first pressing member and the second pressing member, and penetrates a backside of the other one of the first pressing member and the second pressing member on an opposite side from the one of the first pressing member and the second pressing member,
    wherein the receiving member and the other one of the first pressing member and the second pressing member are opposed to each other from the backside of the other one of the first pressing member and the second pressing member in the pipe axial direction, and wherein the extendable drive is attached to the other one of the first pressing member and the second pressing member and the receiving member.

5. The watertight testing device for a pipe joint part according to claim 3, wherein when the first and second pressing members move in the release direction and return to a release position, the annular first and second seal members are released, and wherein the cylindrical core is provided with a moving-range regulating member that limits an excessive movement of the first and second pressing members beyond the release position in the release direction.

6. The watertight testing device for a pipe joint part according to claim 1, further comprising a plurality of wheels for movement in the one pipe and the other pipe, wherein the wheels are omni wheels rotatable in the pipe axial direction and a pipe circumferential direction.

* * * * *